United States Patent [19]

Jackson et al.

[11] Patent Number: 5,572,344
[45] Date of Patent: Nov. 5, 1996

[54] PIXEL ELEMENTS HAVING RESISTIVE DIVIDER ELEMENTS

[75] Inventors: Warren B. Jackson, San Francisco; David K. Biegelsen, Portola Valley; David A. Jared, Mountain View; Richard L. Weisfield, Los Altos, all of Calif.

[73] Assignee: Xerox Corporation, Stamford, Conn.

[21] Appl. No.: 368,131

[22] Filed: Jan. 3, 1995

[51] Int. Cl.⁶ .................................................. G02F 1/1393
[52] U.S. Cl. .................................................. 359/58; 359/60
[58] Field of Search ............................ 359/58, 59, 60

[56] References Cited

U.S. PATENT DOCUMENTS

| | | | |
|---|---|---|---|
| 4,728,175 | 3/1988 | Baron | 359/60 |
| 4,818,078 | 4/1989 | Mouri et al. | 359/56 |
| 4,824,218 | 4/1989 | Kuno et al. | 359/56 |
| 4,906,072 | 3/1990 | Kaneko et al. | 359/56 |
| 5,204,764 | 4/1993 | Maeda et al. | 359/58 |
| 5,490,002 | 2/1992 | Nicholas | 359/58 |

*Primary Examiner*—William L. Sikes
*Assistant Examiner*—Kenneth Parker

[57] ABSTRACT

Pixel elements capable of imaging spatial intensity variations within themselves, and displays comprised of such elements, are described. The pixel elements include a resistance layer disposed between at least one set of electrodes. Over that resistance layer is a liquid crystal material. Over that liquid crystal material is a field electrode. In operation a voltage, whose components are referenced to the field electrode, is applied across the resistance layer. The resulting current flow induces a spatially varying electric field between the field electrode and the resistance layer. That spatially varying electric field results in a corresponding response by the liquid crystal layer which results in a spatially varying light transmission through the liquid crystal material. By varying the voltage across the resistance layer and/or the voltage applied to the field electrode varying amounts of light transmission can be achieved.

2 Claims, 4 Drawing Sheets

PIXEL ELEMENTS HAVING RESISTIVE DIVIDER ELEMENTS

FIELD OF THE INVENTION

This invention relates to image display technology.

BACKGROUND OF THE INVENTION

Modern image displays are based on the concept of pixels. In the prior art a pixel represented the smallest element of an image which could be independently adjusted. A composite image was comprised of the sum of all of the individual pixels. Each pixel of an image must be generated by a pixel element: a device which causes a pixel to be displayed. Since a given image may be comprised of millions of pixels, millions of pixel elements may be required to display an image at its full resolution.

In the prior art there were two basic types of pixels: binary, which means that the intensity of a pixel is either fully OFF or fully ON, and gray-valued, which means that the intensity level of a pixel uniformly varies over a range of values, either continuously or in steps, from fully OFF to fully ON.

With either type of prior art pixel it is relatively easy to display an image. The pixel elements are simply set at a given intensity. However, displaying edges, particularly with high positional accuracy, is more difficult. An edge is a part of an image where the intensity makes a spatially rapid transition from one level to a contrasting level. Positional accuracy means the accuracy in placing an edge relative to other features in the displayed image. A fundamental problem with displaying an edge using prior art pixel elements is that each pixel element has a spatially uniform intensity: the intensity of a pixel element was spatially constant. Therefore, when an edge occurred within a pixel element, the position of that edge could only be approximated in discrete steps corresponding to the pixel element boundaries. However, this creates a problem. Because human vision is capable of detecting relative edge offsets at least ten times smaller than the smallest resolved periodic features, this effect being called edge acuity, the eye is sensitive to the discrete steps rendered by pixel element boundaries. Thus, very high positional accuracy is required to produce a high quality visual image.

One method of improving positional accuracy is to increase the pixel element density of a display. However, when the pixel element density increases beyond certain levels, the fabrication of the individual pixel elements and the storage and processing of the required image data become difficult. Increasing the pixel element density is wasteful in that it uses a high pixel element density simply to improve edge acuity.

Therefore, new types of display pixel elements which are capable of displaying subpixel image information would be advantageous.

SUMMARY OF THE INVENTION

The present invention provides for pixel elements that are capable of creating spatial modulation variations within themselves. Displays made from such pixel elements are capable of displaying edge positions with subpixel accuracy. A pixel element according to the principles of the present invention includes a resistance layer disposed between at least one set of lateral electrodes. Over that resistance layer is an electro-optic material (e.g. a liquid crystal layer). Over that electro-optic material is a field electrode. In operation, a voltage difference, whose voltage components are referenced to the field electrode, is applied across the resistance layer. The resulting current flow across the resistance layer creates a spatially varying voltage across that layer. That spatially varying voltage creates a spatially varying electric field between the field electrode and the resistance layer. That spatially varying electric field causes the electro-optic material to spatially modulate the light transmission through itself. By varying the voltage across the resistance layer and/or by varying the voltage applied to the field electrode, varying amounts of light modulation through the electro-optic material is achieved.

BRIEF DESCRIPTION OF THE DRAWINGS

Other aspects of the present invention will become apparent as the following description proceeds and upon reference to the drawings, in which.

Figure 1:
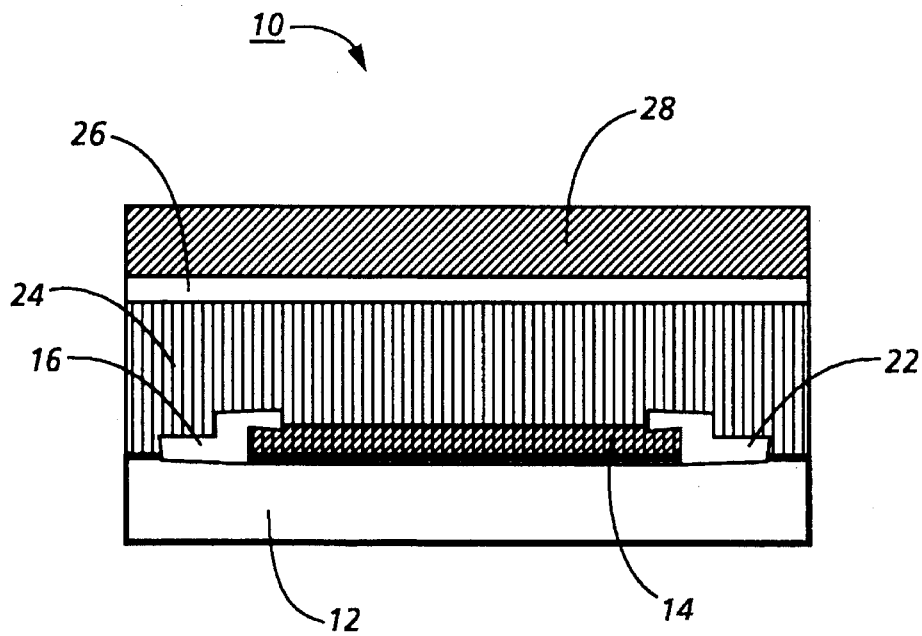
FIG. 1 schematically illustrates a side view of a first embodiment pixel element which is in accord with the principles of the present invention.

Note that in the drawings that like numbers designate like elements. Additionally, the subsequent text includes various directional signals (such as right, left, up, down, top, bottom, lower and upper) which are taken relative to the drawings. Those signals are meant to aid the understanding of the present invention, not to limit it.

DETAILED DESCRIPTION OF PREFERRED EMBODIMENTS

OVERVIEW

The present invention provides for pixel elements that are capable of displaying spatial light modulation variations within themselves. Displays which can show edge positions with subpixel accuracy can be made from the inventive pixel elements. Pixel elements according to the principles of the present invention are related to the technology found in co-pending U.S. patent applications Ser. No. 08/368,138 entitled, "SEGMENTED RESISTANCE LAYERS WITH STORAGE NODES," and Ser. No. 08/368,114 entitled, "INTEGRATING HYPERACUITY SENSORS AND ARRAYS THEREOF". Those patent applications are hereby incorporated by reference.

A pixel element according to the principles of the present invention includes a resistance layer disposed between at least one set of lateral electrodes. The resistance layer may be isotropic (having a constant resistance per unit length), it may have a resistance which varies in direction or location, and/or it may include conductive storage nodes. Over the resistance layer is a liquid crystal material. Over that liquid crystal material is a field electrode. In operation, a voltage difference, whose voltage components are referenced to the field electrode, is applied across the resistance layer. The resulting current flow induces a spatially varying voltage across the resistance layer. That spatially varying voltage creates a spatially varying electric field between the field electrode and the resistance layer. That spatially varying electric field causes the liquid crystal material to exhibit spatially varying modulation of transmitted light. Therefore, by varying the voltage across the resistance layer and/or by varying the voltage applied to the field electrode, a spatially varying light transmission through the liquid crystal material can be achieved. If charge storage nodes and a switchable-resistance resistance layer are used, the spatially varying light transmission can exist for a time after the field electrode voltage is removed.

The response of the liquid crystal material to the electric field depends on the properties of the particular material used. That response can be made to vary from a linear response, where light modulation varies in direct proportion to the local field, to a highly non-linear response, where a threshold field exists. For electric fields below the threshold, the light transmission can be at one extreme value, full OFF for example, whereas, for electric fields above the threshold value, the light transmission can be at the complementary extreme value, full ON for example. Thus pixel elements according to the present invention can render internal variations ranging between continuous proportional responses (e.g., bilinearly interpolated between the edge values) and binary, wherein an abrupt edge can be continuously translated across the pixel element. By arranging individual pixel elements into a one or two dimensional array, a complete display, capable of subpixel edge positioning, can be fabricated.

A FIRST EMBODIMENT PIXEL ELEMENT

Figure 2:
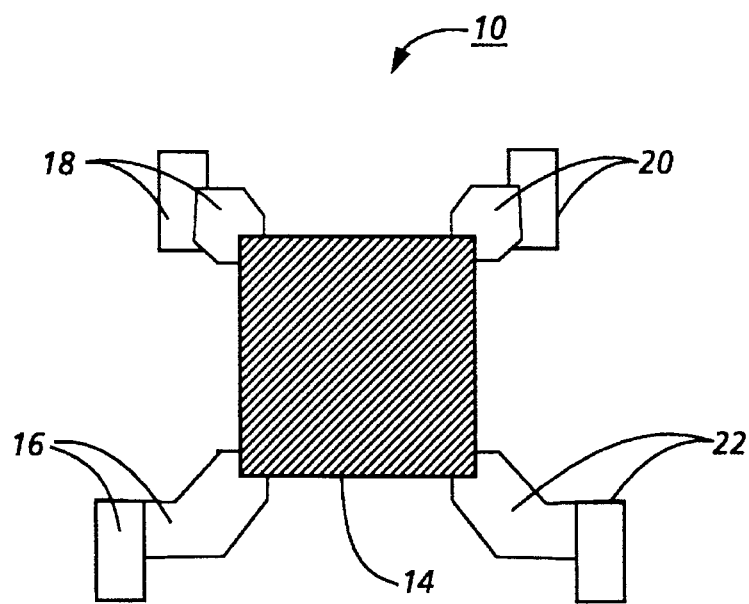
FIG. 2 shows a top down view of the pixel element shown in FIG. 1.

A more detailed understanding of the principles of the present invention may result from studying the first embodiment pixel element 10 illustrated in FIGS. 1 and 2. The pixel element 10 is comprised of an optically transparent substrate 12 (shown only on FIG. 1) over which an optically transparent resistance layer 14 is located. If the inventive device is to be used in a reflective mode instead of transmissive, then the substrate and resistive layer can be opaque. That resistance layer may or may not have a constant resistance per unit area. Furthermore, while the shape of the resistance layer 14 is square, depending on the application other shapes, including rectangular, triangular, hexagonal, and round, may be advantageous.

Disposed at each corner of the resistance layer 14 is an electrode, the electrodes 16 through 22. While the simplest pixel element would have only one set (two) of electrodes, placing electrodes at each corner enables complex electric field distributions, and thus complex light distribution patterns, to be created. Over the resistance layer 14 and the electrodes 16 through 22 is a layer of liquid crystal material 24. Over that liquid crystal material is an optically transparent field electrode 26. Finally, over the field electrode is an optically transparent passivating layer 28. Note that the liquid crystal material 24 is sandwiched between the field electrode 26 and the substrate-resistance layer-electrode structures. Further structures such as current distribution lines, insulating layers and light blocking elements can be added in ways obvious to those skilled in the art of display design.

In operation, voltages are applied to the electrodes 16 through 22. Additionally, a voltage is applied to the field electrode 26. While those voltages could all be the same, all different, or some of them equal to others but different from the remaining, they are all referenced to each other. (That is, they have a common reference point.) The voltages on the electrodes 16 through 22 create currents which flow across the resistance layer 14. The resulting spatially varying voltage creates a spatially varying electric field. When light from a light source (not shown, but presumed to be below the substrate 12) is polarized and made incident upon the pixel element 10, the spatially varying electric field induces the liquid crystal material to spatially vary the transmission of the incident light through the liquid crystal material. Thus, the pixel element 10 achieves a light transmission which can vary spatially within the pixel. In fact, depending on the properties of the liquid crystal material, the phase, amplitude, wavelength, and/or polarization of the incident light can be spatially modulated with subpixel resolution.

A SECOND EMBODIMENT PIXEL ELEMENT

Figure 3:
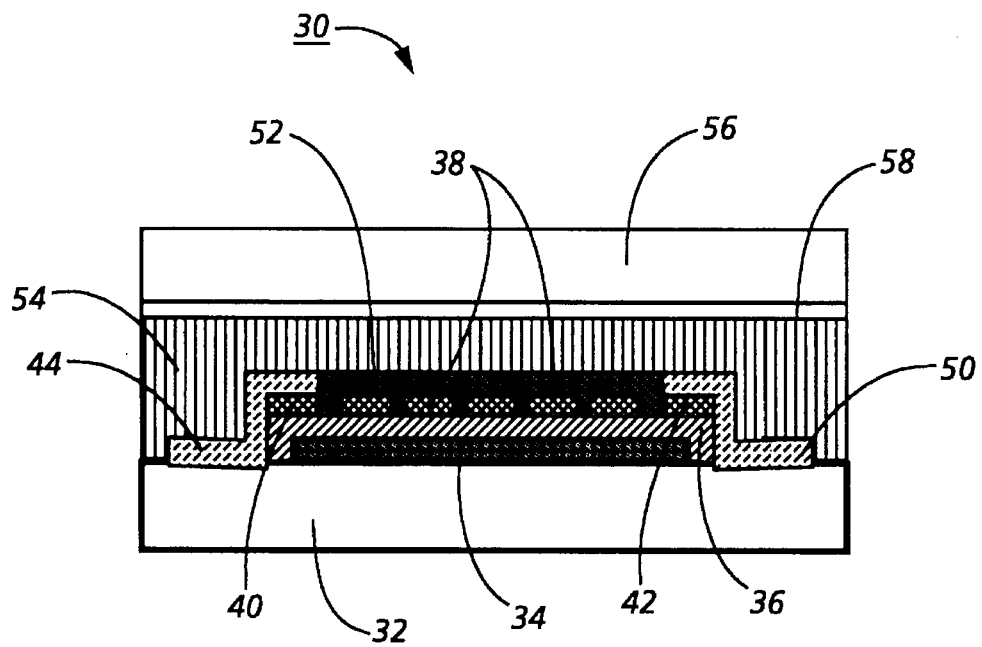
FIG. 3 illustrates a schematic side view of an alternative pixel element which is similar to that shown in FIGS. 1 and 2, but which has an alternative resistance layer.
Figure 4:
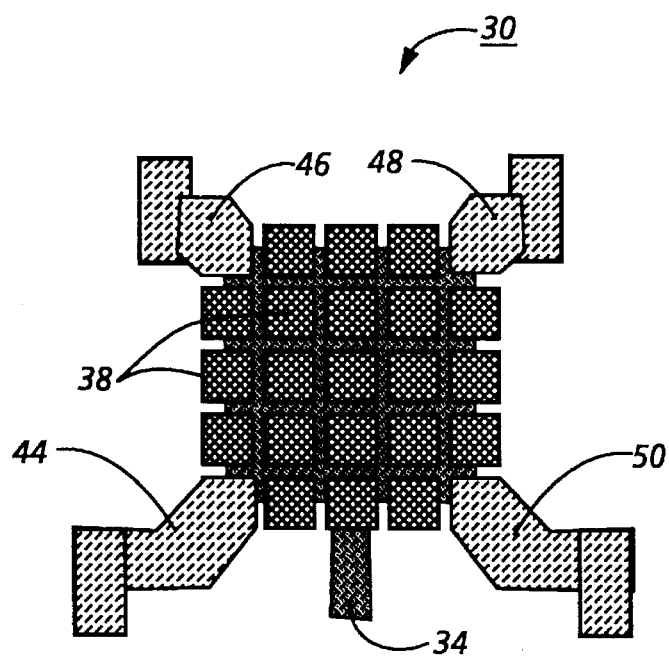
FIG. 4 shows a top down view of the pixel element shown in FIG. 3.

While the first embodiment pixel element 10 has its advantages, FIG. 3 shows another embodiment pixel element 30 which may be preferred in some applications. FIG. 3 shows a pixel element which is similar to that shown in FIGS. 1 and 2 except that a segmented resistance layer structure (described below) replaces the continuous resistive layer 14.

In detail, the pixel element 30 includes an optically transparent substrate 32 onto which an optically transparent gate electrode 34 of indium-tin-oxide is deposited. The gate electrode is then covered with a dielectric layer 36, which is beneficially of silicon nitride. Over the dielectric layer 36 an n-type amorphous silicon layer is deposited. That amorphous silicon layer is photolithographically patterned into a plurality of segmented storage nodes 38 and into four collection contacts, only two of which, the collection contacts 40 and 42, are shown (in FIG. 3). The collection contacts are then covered by metallic electrodes, the electrodes 44, 46, 48, and 50. The metallic electrodes are beneficially made of aluminum. The collection contacts 40 and 42 are covered by the electrodes 44 and 50. The two collection contacts which are not shown in the figures are covered by the electrodes 46 and 48.

The exposed portions of the storage nodes 38 and the collection contacts are then covered with a layer of undoped amorphous silicon which forms an active layer 52. The active layer is formed such that it makes low resistance contacts with the storage nodes and with the collection contacts. The resulting structure is then covered with a liquid crystal material 54. The liquid crystal material is then encapsulated by a transparent metal coated glass cover 56 (that cover may also be plastic) which has a metal coating 58 at ground (or at another suitable potential). As shown in FIG. 3, the metal coating 58 is located adjacent the liquid crystal material.

The storage nodes 38 act as equipotential subpixels. As described in co-pending U.S. patent application Ser. No. 08/368,138 entitled, "SEGMENTED RESISTANCE LAYERS WITH STORAGE NODES," which is hereby incorporated by reference, a gate voltage applied to the gate electrode 34 controls the resistance of the active layer 52 such that the active layer acts like a switch which can be turned from a high resistance state to a low resistance state. When the gate voltage applied turns the active layer ON (the active layer has a low resistance) voltages applied to the electrodes 44 through 50 causes currents to flow which results in charges on the storage nodes 38. The pixel element 30 then acts like the pixel element 10 in that the voltages applied to the electrodes control the light transmission through the pixel element. However, when the voltage applied to the gate electrode 34 turns the active layer OFF (the active layer switches to a high resistance) the charges on the storage nodes are trapped. Those trapped charges act to maintain the local fields across the liquid crystal material, and thus act to retain the prior light transmission through the pixel element 30. Any voltages on the electrodes have little effect on the light transmission properties of the pixel element.

When the active layer 52 is OFF, the discharge time of each storage node 38 is given by the product $R_{off}C$, where $R_{off}$ is the OFF state resistance of the active layer between the storage nodes and collection electrodes and C is the capacitance of the storage node. For most applications $R_{off}C$ should be approximately three times the refresh time, $\tau$. The writing time, the time required to accumulate the charge on each storage node is approximately $R_{on}C$, where $R_{on}$ is the ON state resistance of the active layer. $R_{on}$ should be much shorter than $\tau$. These conditions are easily achieved using amorphous or polycrystalline silicon films.

VARIATIONS

Figure 5:
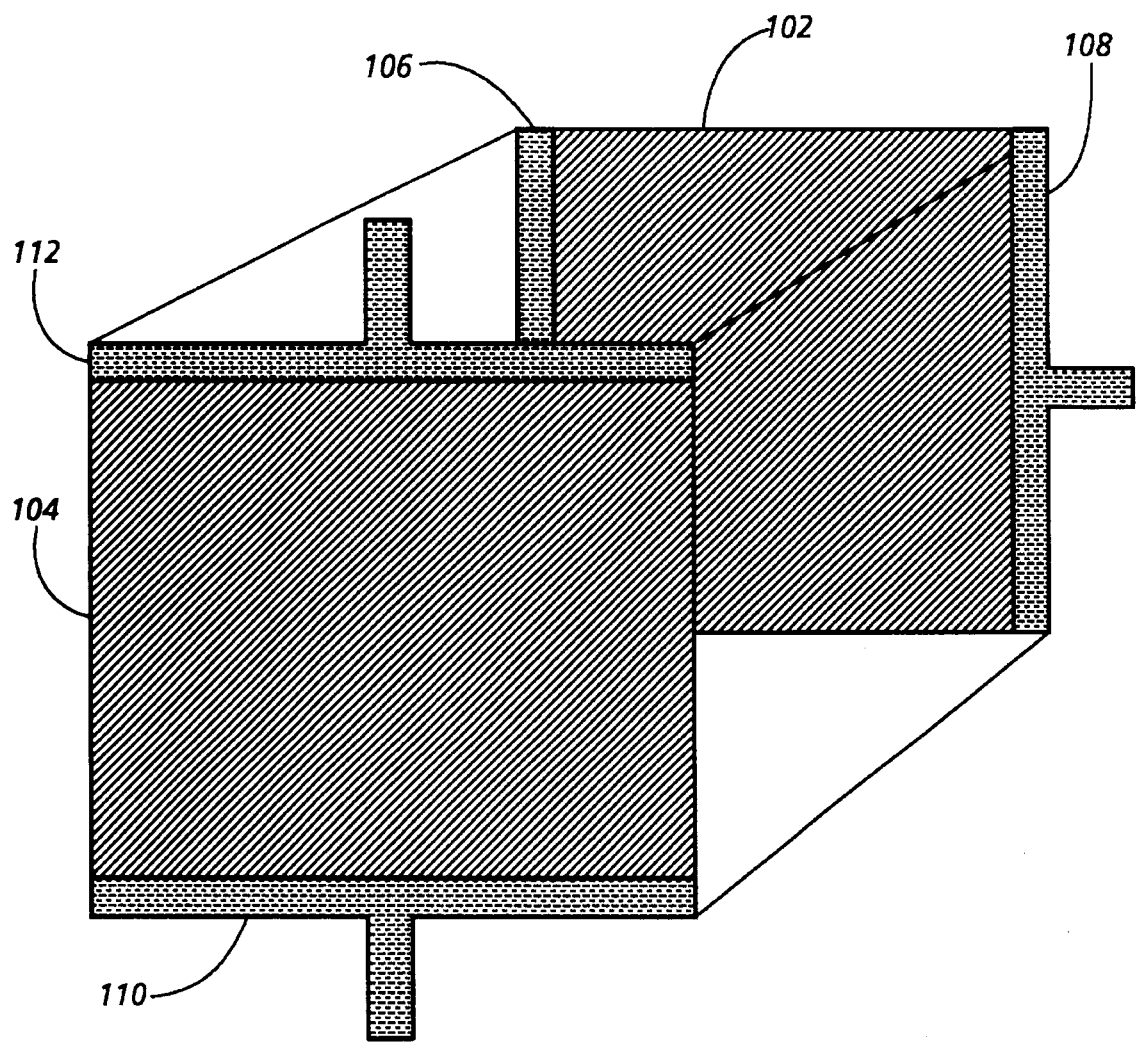
FIG. 5 depicts a variation of the pixel element illustrated in FIGS. 1 and 2 in which the bottom resistive layer and the top field electrode are replaced by bottom and top resistive layers.

It is to be understood that while FIGS. 1 through 4 illustrate various embodiments of the present invention, they are exemplary only. Others will recognize numerous variations and adaptations of the illustrated embodiments which will remain within the principles of the present invention. For example, FIG. 5 will help illustrate one possible variation of the continuous layer pixel element shown in FIGS. 1 and 2. FIG. 5 shows a blow-up of two resistance layers, a lower layer 102 and an upper layer 104. Attached along opposite sides of the lower layer 102 are electrodes 106 and 108. Attached along opposite sides of the upper layer 104 are electrodes 110 and 112. As shown in FIG. 5, the electrodes 106 and 108 are aligned in a first direction while the electrodes 110 and 112 are aligned perpendicular to that first direction.

Now, referring to FIGS. 1 and 5 as required, the differences between the pixel element 10 as described with reference to FIGS. 1 and 2 and its variation depicted with the assistance of FIG. 5 are that the lower layer 102 and electrodes 106 and 108 replace the resistance layer 14 and the electrodes 16 through 22 on the substrate 12, and the upper layer 104 and electrodes 110 and 112 replace the field electrode 26. Note that the liquid crystal material 24 of FIG. 1 is sandwiched between the upper and the lower resistance layers.

Operation of the variation involves applying voltages which share a common reference point to the electrodes 106–110. Those voltages induce separate current flows across the upper and lower resistance layers. The resulting voltage drops across the upper and lower resistance layers create spatially varying electric fields across the liquid crystal material. The spatially varying electric field causes spatially varying light transmission through the liquid crystal material. By varying the voltages applied to the various electrodes, different light transmission characteristics can be achieved through the liquid crystal material.

ARRAYS

Figure 6:
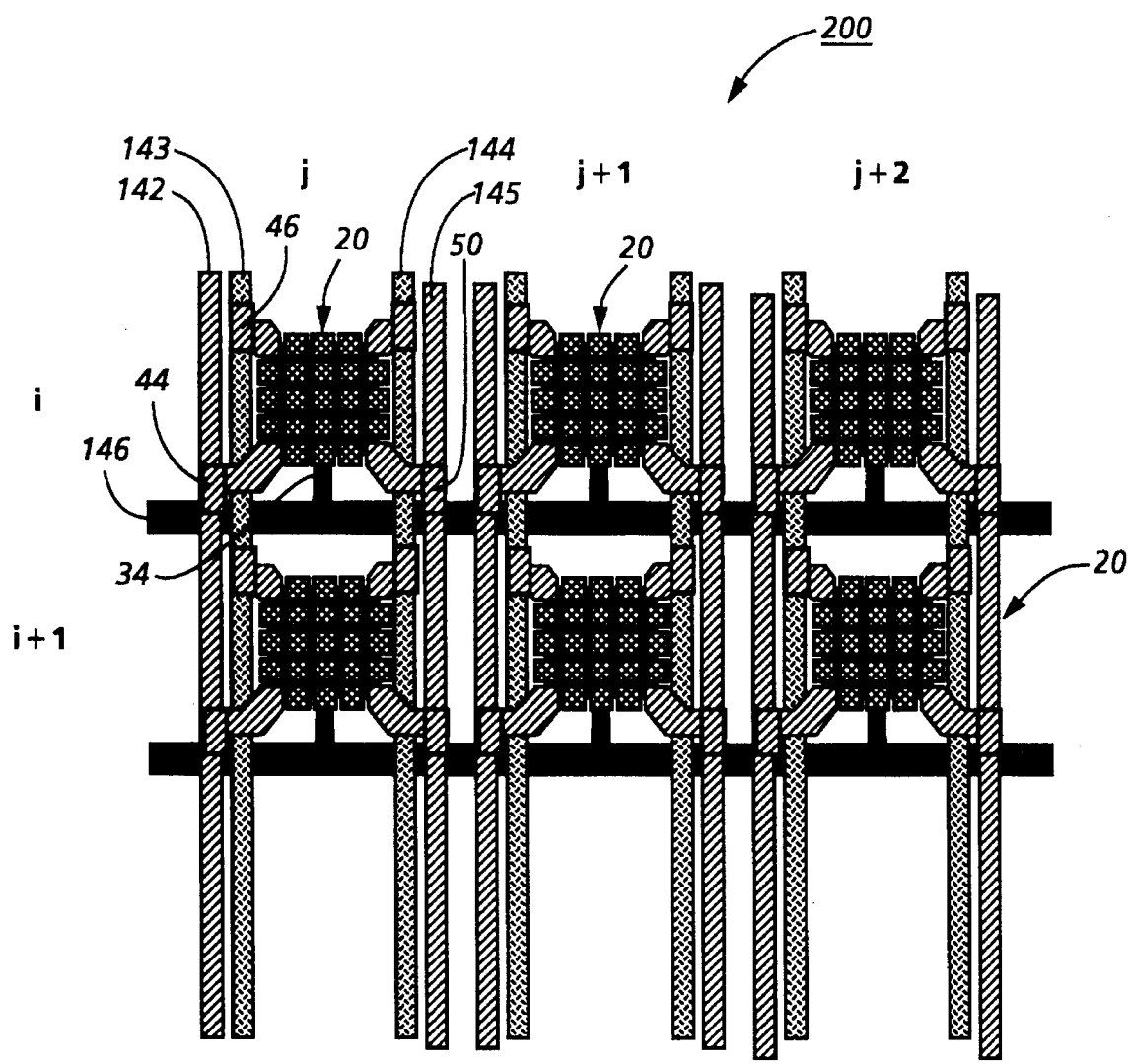
FIG. 6 illustrates an array of the pixel elements as shown in FIG. 3.

While pixel elements according to the present invention are individually interesting and useful, their most useful application may be in arrays, either one dimensional or two dimensional, of pixel elements which form a display. For example, FIG. 6 illustrates a display 200 which is comprised of a 2-dimensional array of six (6) pixel elements 30 organized into three (3) columns, the columns j, j+1, and j+2 and into two (2) rows, the rows i and i+1. As shown, the pixel elements of each column have their electrodes 44 through 50 connected to, respectively, column lines 142 through 145. The pixel elements in each row have their gate electrodes 34 connected to a row lines 146. Light transmission through each pixel element can be set in a sequential manner using either an active matrix addressing scheme or, if the liquid crystal has a sufficiently high threshold field, a passive matrix scheme. Addressing can be performed by applying pixel information voltages to the column lines 142 through 145 of a column, say column j, and then applying a gate turn on voltage to the row line 146 which connects a row, say row i, of pixel elements. If row i is selected and pixel information voltages are applied to column j, the pixel element 200 is enabled. Then, the pixel information voltages set the light transmission characteristics of the pixel element 200. When the gate turn on voltage is removed, the charges trapped on the pixel element's storage nodes act to retain the light transmission characteristics of the pixel element.

FIG. 6 illustrates only one example of a display comprised of pixel elements according to the present invention. Numerous variations and adaptations of the illustrated display and/or combinations with the various pixel element embodiments are possible.

It is to be further understood that while the figures and the above descriptions illustrate the present invention, they are exemplary only. Others will recognize numerous modifications and adaptations of the illustrated embodiment which are in accord with the principles of the present invention. Therefore, the present invention is to be limited only by the appended claims.

What is claimed:

1. A pixel element comprised of:

a substrate;

a gate electrode over said substrate;

an isolation layer over said gate electrode;

a plurality of conductive storage nodes for storing induced charges over said isolation layer;

at least two conductive collection electrodes;

an electrically controllable resistance layer having an electrical input, said electrically controllable resistance layer being in a low resistance, touching relationship with both said storage nodes and said at least two collection electrodes;

a layer of electro-optic material over said electrically controllable resistance layer; and a metal conductive layer at a first potential over said layer of electro-optic material;

wherein a voltage applied across said at least two conductive collection electrodes when a gate turn on voltage is applied to said gate electrode causes said electrically controllable resistance layer to have a relatively low resistance such that a current flows through said electrically controllable resistance layer and charges accumulate on said storage nodes, wherein the resistance of said electrically controllable resistance layer becomes relatively high when a gate turn on voltage is not applied to said gate electrode and such that charges on said storage nodes are trapped, and wherein electric fields between said storage nodes and said metal conductive layer controls the light transmission through said electro-optic material.

2. An array of pixel elements comprised of:

a plurality of pixel elements, each of which includes:
- a substrate;
- a gate electrode over said substrate;
- an isolation layer over said gate electrode;
- a plurality of conductive storage nodes for storing induced charges over said isolation layer;
- first and second conductive collection electrodes;
- an electrically controllable resistance layer having an electrical input, said electrically controllable resistance layer being in a low resistance, touching relationship with both said storage nodes and said first and second collection electrodes;
- a layer of electro-optic material over said electrically controllable resistance layer; and
- a metal conductive layer at a first potential over said layer of electro-optic material;
- wherein a voltage applied between said first and second collection electrodes when a gate turn on voltage is applied to said gate electrode causes said electrically controllable resistance layer to have a relatively low resistance such that a current flows through said electrically controllable resistance layer and charges accumulate on said storage nodes, wherein the resistance of said electrically controllable resistance layer becomes relatively high when a gate turn on voltage is not applied to said gate electrode and such that charges on said storage nodes are trapped, and wherein electric fields between said storage nodes and said metal conductive layer controls the light transmission through said electro-optic material;

a plurality of first and second column control lines which interconnect said plurality of pixel elements into columns of pixel elements, said first column control line connecting said first collection electrodes of each pixel element in a column, and said second column control line connecting said second collection electrodes of each pixel element in a column; and a plurality of gate control lines which interconnect said plurality of pixel elements into rows of pixel elements, said gate control lines connecting said gate electrodes of each pixel element in a row together.

* * * * *